UNITED STATES PATENT OFFICE.

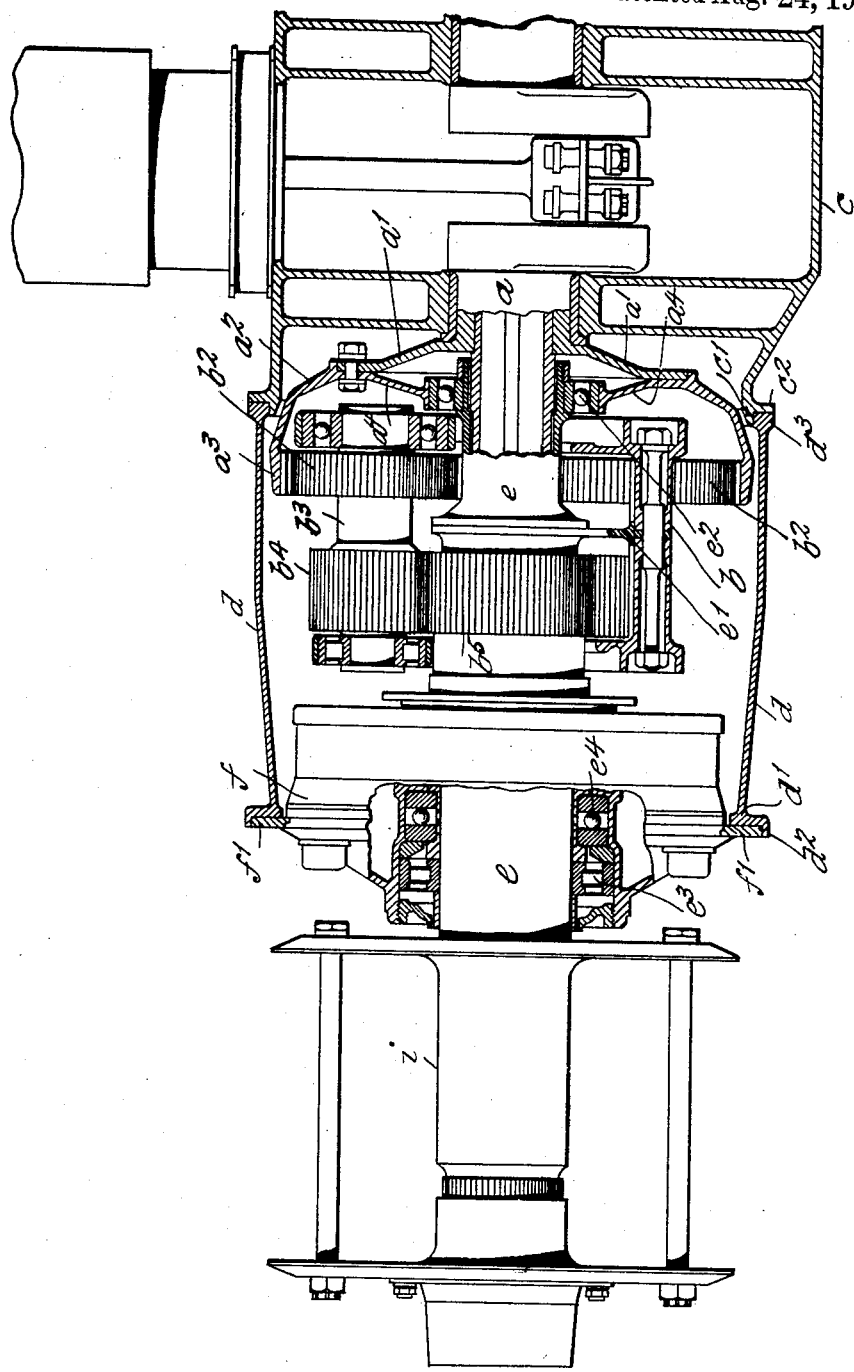

FREDERICK HENRY ROYCE, OF DERBY, ENGLAND, ASSIGNOR TO ROLLS-ROYCE LIMITED, OF DERBY, ENGLAND.

EPICYCLIC GEARING.

1,350,522.   Specification of Letters Patent.   Patented Aug. 24, 1920.

Application filed November 4, 1919. Serial No. 335,630.

*To all whom it may concern:*

Be it known that I, FREDERICK HENRY ROYCE, a subject of the King of England, of Derby, England, have invented certain new and useful Improvements Relating to Epicyclic Gearing, of which the following is a specification.

This invention relates to the alinement of the end bearing on an epicyclic reduction gearing with the bearings of a coaxial motive power shaft and has for its object to provide a simple and more reliable means than has hitherto been available for effecting or adjusting such alinement.

The device is specially suited for use in connection with aircraft engines provided with an epicyclic reduction gear interposed between the engine and the propeller.

According to this invention the object is attained as follows, reference being made to the accompanying drawing which shows a longitudinal sectional elevation through the gearing and appurtenant parts.

$a$ is the crank shaft to which is rigidly fixed a flange $a^1$ to which is attached an extension $a^2$ terminating in an annular internally toothed member $a^3$ which engages with the externally toothed pinions $b^2$ of the epicyclic gear. $b$ is a frame or cage of the epicyclic gear fixed to a flange $e^1$ attached to the propeller shaft $e$ and carrying the pinions $b^2$ rigidly attached to the shafts of axles $b^3$ to which are rigidly attached pinions $b^4$ which engage with the sun wheel $b^5$ anchored in the housing. $c$ is the crank shaft casing, $c^1$ a circular spigot and $c^2$ a flange on the casing $c$, $d$ is the gear casing having an internally and externally projecting flange $d^1$, an annular projection $d^2$ being formed on the outer edge of the surface of said flange $d^1$. $d^3$ is a flange at the other end of the case $d$ fitting the spigot $c^1$ and flange $c^2$ of the casing $c$. $e^1$ is a flange fixed to the propeller shaft $e$ and to which the cage $b$ of the epicyclic gearing is fixed as aforesaid. $e^2$ is a ball bearing supported by a branch $a^4$ of the extension $a^1$ and carrying one end of the propeller shaft $e$. $e^3$ is a roller bearing carrying the other end of said shaft. $e^4$ is a ball bearing to take the end thrust of the shaft. $f$ is a housing supporting the roller bearing $e^3$ and end thrust bearing $e^4$, and $f^1$ is an eccentric flange fitting the eccentric recess formed by the flange $d^1$ and the annular projection $d^2$ before referred to. Threaded bolts passing through holes or slots in equally spaced extensions formed on the flanges $c^2$ and $d^3$ with nuts to normally fix the casing $d$ in relation to the casing $c$ when the bearing is adjusted, and like bolts passing through holes or slots in the flanges $d^1$ and $f^1$ with nuts to normally fix the flange $f^1$ in relation to the casing $d$ are not shown since the construction will be readily understood. $i$ designates the hub of the propeller.

From the above description it will be seen that there is formed upon the end of the crankshaft casing $c$ a circular spigot or projection $c^1$ concentric with the crankshaft bearings and adapted to receive and locate the casing $d$ inclosing the reduction gear, said casing being capable of being fixed to the crankshaft casing $c$ in any position rotatively in relation thereto by means of equally spaced bolts or in any other convenient manner. At the end of the gear casing $d$ remote from the crankshaft casing $c$ is the internally and externally projecting flange $d^1$ the inner circumference of which is machined co-axial with the spigot $c^2$ to act as a reference for setting the adjustment and the outer circumference of which is eccentric with the said spigot by a certain small amount. Projecting from the surface of the flange $d^1$ in the direction away from the crank shaft casing and on the outer edge of such surface and at right angles thereto is the regular annular projection $d^2$ which with the flange forms a circular recess which can receive the flange $f^1$ of the housing $f$ which flange projects radially from the end bearing housing and has its outer circumference eccentric in relation to the bore of the housing, by an amount equal to the eccentricity of the recess formed on the casing $d$ by the flange $d^1$ and annular projection $d^2$. The two casings can be fixed in any position rotatively in relation to one another and the housing to the crank casing in any position rotatively in relation to such casing.

By loosening the nuts of the bolts normally fixing the casing $d$ in relation to the casing $c$, the casing $d$ with the eccentric recess can, within limits, be rotated and by loosening the nuts of the bolts normally fixing the flange $f^1$ in relation to the casing $d$ the housing $f$ with its eccentric flange $f^1$ can be rotated and hence the bearing $e^3$ can be moved in any direction within the sum of the two eccentricities.

What I claim as my invention and desire to secure by Letters Patent of the United States is:—

1. The combination of a driving and a driven member and gearing between said members, an end bearing for the driven member and means for adjusting the alinement of said end bearing in relation to the driving member, said means comprising a casing having an annular spigot, coaxial with the driven member, a second casing engaging at one end with said spigot and rotatable in relation to the first casing, said second casing terminating at its other end in an annular recess eccentric with regard to the spigot, a housing supporting the aforesaid end bearing and a flange carried by the housing and eccentric thereto, said flange engaging the annular recess in the second casing whereby the housing is rotatable in relation to said second casing.

2. The combination of a driving and a driven shaft and epicyclic reduction gearing interposed between said shafts, an end bearing for the driven shaft, and means for adjusting the alinement of said bearing in relation to the driving shaft, said means comprising a casing having an annular spigot coaxial with the driven shaft, a second casing engaging at one end with said spigot and rotatable in relation thereto, means for securing the said two casings in fixed relation, said second casing terminating at its other end in an annular recess eccentric with regard to the spigot, a housing supporting the aforesaid end bearing for the driven shaft, a flange carried by the housing eccentric to the bore thereof, said flange engaging the annular recess in the second casing whereby the housing is rotatable in relation to said second casing and means for securing said housing and second casing in fixed relation.

In witness whereof I have signed this specification in the presence of two witnesses.

FREDERICK HENRY ROYCE.

Witnesses:
   H. R. CUTTEN,
   F. PARSONS.